United States Patent [19]

Gorski et al.

[11] Patent Number: 5,037,570
[45] Date of Patent: Aug. 6, 1991

[54] REFRIGERATION COMPOSITIONS AND PROCESS FOR USING

[75] Inventors: Robert A. Gorski, Newark, Del.; William L. Brown, Pleasantville, N.Y.

[73] Assignee: E. I. Du Pont de Nemours and Company, Wilmington, Del.

[21] Appl. No.: 519,326

[22] Filed: May 3, 1990

Related U.S. Application Data

[63] Continuation of Ser. No. 360,983, Jun. 2, 1989, abandoned.

[51] Int. Cl.⁵ .......................................... C10M 129/16
[52] U.S. Cl. .................................. 252/54; 252/52 A; 252/68
[58] Field of Search .............................. 252/54, 68, 52

[56] References Cited

U.S. PATENT DOCUMENTS

| | | | |
|---|---|---|---|
| 3,791,971 | 2/1974 | Lowe | 252/52 A |
| 4,199,461 | 4/1980 | Olund | 252/49.8 |
| 4,248,729 | 2/1981 | Uchinuma et al. | 252/52 A |
| 4,755,316 | 7/1988 | Magid et al. | 252/68 |
| 4,900,463 | 2/1990 | Thomas et al. | 252/54 |

Primary Examiner—Jacqueline V. Howard

[57] ABSTRACT

A blend of a tetrafluoroethane or pentafluoroethane refrigerant with a di-functional random polyalkylene glycol based on significant amounts of ethylene oxide and propylene oxide and having an SUS viscosity at 100° F. of 100 to 1200 is disclosed for use in compression refrigeration.

12 Claims, 1 Drawing Sheet

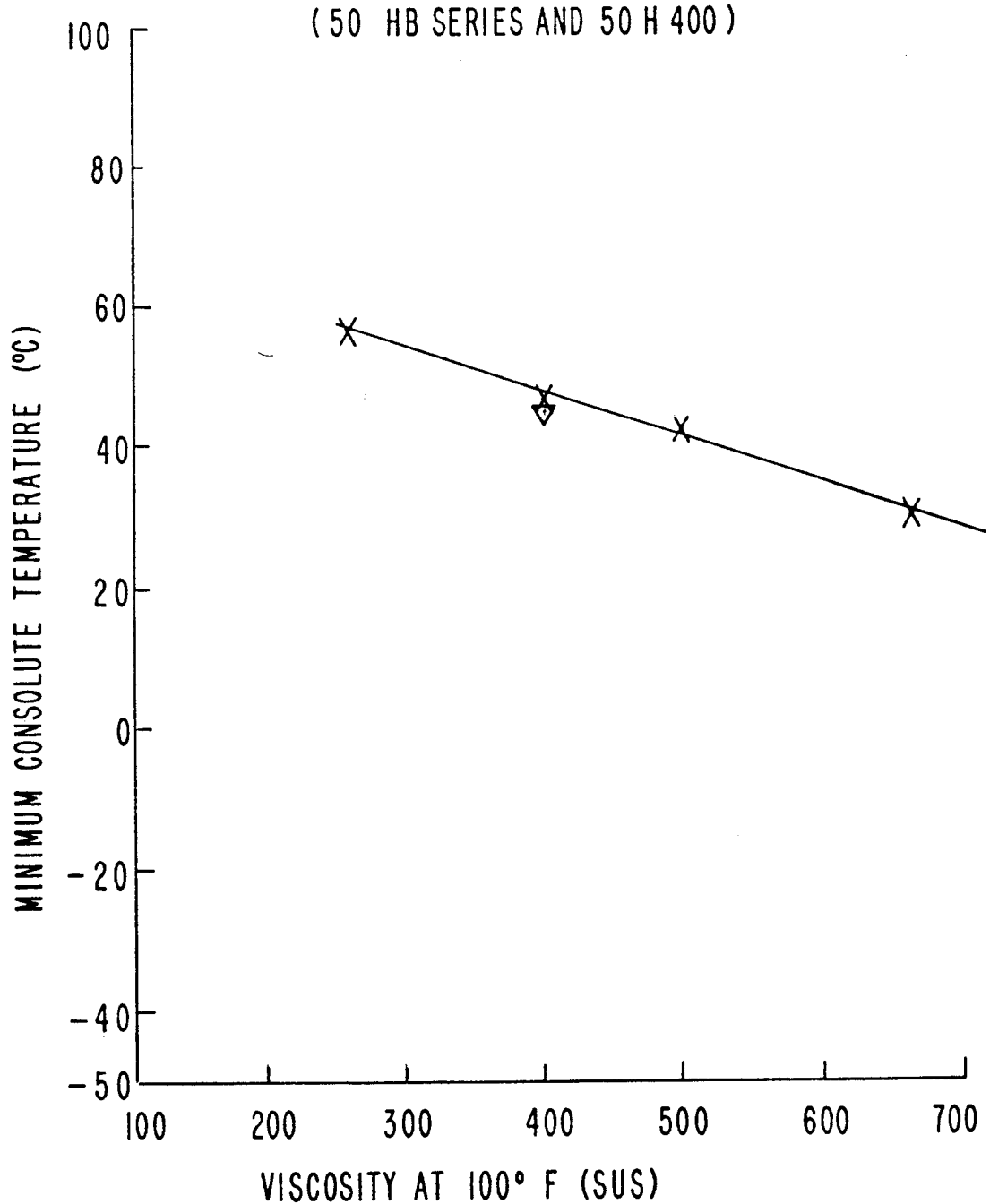

REFRIGERATION COMPOSITIONS AND PROCESS FOR USING

This application is a continuation of application Ser. No. 360,983, filed June 2, 1989, now abandoned.

FIELD OF THE INVENTION

This invention relates to lubricants used with refrigerants in compression refrigeration. More particularly, it relates to lubricants for use with tetrafluoroethanes, e.g. 1,1,1,2- Tetrafluoroethane (HFC-134a), 1,1,2,2- Tetrafluoroethane (HFC-134), etc., and of lesser importance, pentafluoroethanes (HFC-125). These refrigerants are being considered as replacements for dichlorodifluoromethane (CFC-12), particularly in automotive air conditioning systems. cl BACKGROUND OF THE INVENTION Refrigeration systems that use CFC-12 as the refrigerant generally use mineral oils to lubricate the compressor. (See for example the discussion in Chapter 32 of the 1980 ASHRAE Systems Handbook.) CFC-12 is completely miscible with such oils throughout the entire range of refrigeration system temperatures, i.e. −45° C. to 65° C. In automotive air-conditioning, paraffinic and naphthenic oils of about 500 SUS viscosity at 100° F. are used with CFC-12. These oils have "pour points" below −20° C. and are completely miscible with the CFC-12 refrigerant over the range of temperatures from −10° C. to 100° C. Consequently, oil which dissolves in the refrigerant travels throughout the refrigeration loop in the air conditioning system and returns with the refrigerant to the compressor. It does not separate during condensation, although it may accumulate because of the low temperature when the refrigerant is evaporated. At the same time, this oil which lubricates the compressor will contain some refrigerant which, in turn, may affect its lubricating properties.

When substituting HFC-134a or HFC-134 for CFC-12 in these refrigeration systems, it would be desirable to be able to use the same mineral oils as used with CFC-12. It would not require any substantial change in equipment nor any significant changes in conditions used for the system. If lubricant separates from refrigerant during operation of the system, serious problems may result, i.e. the compressor could be inadequately lubricated. This would be most serious in automotive air-conditioning systems because the compressors are not separately lubricated and a mixture of refrigerant and lubricant circulate throughout the entire system. Unfortunately, however, the mineral oils are not adequately miscible with the tetrafluoroethanes.

Two recent publications of ASHRAE discuss the problems associated with separation of lubricants and refrigerants. These are "Fundamentals of Lubrication in Refrigerating Systems and Heat Pumps" Kruse and Schroeder ASHRAE Transactions Vol. 90 Part 2B, pps. 763–782, 1984 and "Evaluation of Lubricants for Refrigeration and Air-Conditioning Compressors" Spauschus ibid pps. 784–798.

In summary, refrigerants which are not completely miscible with an oil in the full range of mixture compositions and operating temperatures may become miscible or immiscible as the temperature is raised or lowered from room temperature. The areas of immiscibility may assume a variety of shapes, i.e. parabolic or non-parabolic. As a parabola, the curve of miscibility temperature vs. percent oil in the mixture, may have its open or concave portion facing the low or high temperatures. The closed or convex portion of the parabolic curve identifies, respectively, the maximum or minimum temperature above or below which the refrigerant and the lubricating oil are completely miscible. These temperatures are referred to as the maximum or minimum "consolute temperatures." Beside parabolas, these curves can assume skewed parabolic shapes or curves of varying slope wherein immiscibility occurs above or below the curve.

One of the objects of this invention is to provide a combination of lubricating oil and tetrafluoroethane, e.g. HFC-134a, where the area of miscibility encompasses the full ranges of temperature and composition encountered in compression refrigeration, i.e., complete miscibility occurs for all compositions in the range of −45° C. to at least 20° C. Another object is to provide a process for using such compositions in compression refrigeration.

PRIOR ART

U.S. Pat. No. 4,248,726, issued Feb. 5, 1981, and U.S. Pat. No. 4,267,064. issued May 12, 1981, both to Nippon Oil Co. et al, relate to the use of a polyglycol oil such as polyoxypropylene glycol (or an alkyl ether thereof) having a viscosity index of at least 150 and a glycidyl ether type epoxy compound as a high viscosity refrigeration oil composition for halogen-containing refrigerants. These polyglycol/glycidyl ether compositions are disclosed for use with Freon ® 11, 12, 13, 22, 113, 114, 500 and 502; and as being "particularly effective" with Freon ® 12 or 22.

RESEARCH DISCLOSURE 17486 ENTITLED

"Refrigeration Oil" by E. I. du Pont de Nemours & Co. discloses polyalkylene glycols such as "Ucon" LB-165 and "Ucon" LB-525 sold by Union Carbide Corporation, for use with HFC-134a. These glycols are polyoxypropylene glycols that are mono-functional and are prepared from propylene oxide initiated with n-butanol. The publication states that these combinations of oil and refrigerant are miscible in all proportions at temperatures at least as low as −50° C. and are thermally stable in the presence of steel, copper and aluminum at 175° C. for about six days.

U.S. Pat. No. 4,755,316, issued July 5, 1988, to Allied-Signal Inc. also relates to the use of polyalkylene glycols. However, these glycols are at least difunctional with respect to hydroxyl groups and contain at least 80% propylene units relative to the total, the remaining 20% may derive from ethylene or butylene oxide or esters, olefins and the like which are polymerizable with propylene oxide. It should be noted that only 100% oxypropylene units in the difunctional PAG's are exemplified in this patent.

SUMMARY OF THE INVENTION

The present invention is based on the discovery that the use of a sufficient amount to lubricate, usually 10–20% by volume, for automotive use, but in some situations as high as 50% by volume of at least one di-functional, preferably a random, polyalkylene glycol (PAG), also is referred to as polyoxyalkylene glyclol, based on a significant amount of ethylene oxide with propylene oxide, preferably from 25%–75% ethylene oxide and, correspondingly, 75%–25% propylene oxide, will be completely miscible with tetrafluoroethane and pentafluoroethanes, usually 80–90% by volume of the tetrafluoroethanes, HFC-134 and HFC-134a, and the pentafluoroethane, HFC-125, or blends thereof with each other and with other refrigerants in the range of temperatures from −40° C. to at least 20° C. The more preferred weight per cents of oxypropylene units and oxyethylene units in the PAG are from 40–60% to 60–40%, respectively; and the most preferred ratio is about 50:50. The weight ratio of refrigerant to the PAG lubricant in the mixtures used for refrigeration may be anywhere from 99/1 to 1/99, preferably 99/1 to 70/30. The viscosities of these compositions may be anywhere from 100 to 1200 SUS but for most commercial uses, from 400 to 1000 SUS.

The process of manufacturing the di-functional random PAG's may involve initiation with a glycol having anywhere from two to six carbon atoms between —OH groups. Diethylene glycol is the preferred initiator; and the process of manufacture is described in the Encyclopedia of Polymer Science and Engineering, Volume 6; "Ethylene Oxide Polymers and Copolymers" by Clinton and Matlock, 2nd edition, 1986, John Wiley & Sons.

It has been found that the use of 0.1–1.3% of an "extreme pressure additive" improves the lubricity and load-bearing characteristics of the butanol-initiated monofunctional random polyalkylene glycol having 50% oxyethylene units as set forth in the U.S. application Ser. No. (CH-1651); and it is expected that the EP additives will also improve the quality of the refrigerant-lubricant compositions of this invention. EP additives for use in the invention are included among those disclosed in Table D of U.S. Pat. No. 4,755,316. The preferred ones are the organic phosphates and include Lubrizol ® 1097, a zinc (dialkyl dithio) phosphate manufactured by the Lubrizol Corporation; and SYN-O-AD ® 8478, a 70%/30% blend of tri (2, 4, 6-tri-t-butyl phenyl) phosphate/triphenyl phosphate manufactured by the Stauffer Chemical Company.

EP additives may also be used in conjunction with some of the oxidation and thermal stability improvers and/or corrosion inhibitors disclosed in Table D of U.S. Pat. No. 4,755,316. Such a preferred blend of additives is MLX-788, a proprietary mixture of Union Carbide Corporation containing a phosphate and two amine-containing compounds.

DESCRIPTION OF PREFERRED EMBODIMENTS

As stated previously, the tetrafluoroethanes, e.g. HFC-134a, HFC-134 and pentafluoroethane, HFC-125, particularly HFC134a, have physical characteristics which allow substitution for CFC-12 with only a minimum of equipment changes in compression refrigeration. They could be blended with each other, as well as with other refrigerants including CFC-12($CCl_2F_2$), HCFC-22($CHClF_2$), HFC-152A($CH_3CHF_2$), HCFC-124 ($CHClFCF_3$), HCFC-124a ($CHF_2CClF_2$), HCFC-142b($CH_3CClF_2$), HFC-32 ($CH_2F_2$), HFC-143a($CH_3CF_3$), HFC-143 ($CHF_2CH_2F$), HFC-125($CF_3CHF_2$) and FC-218 ($CF_3CF_2CF_3$); and for purposes of the present invention such blends are not excluded. However, only those blends of tetrafluoroethane or pentafluoroethane with other refrigerants which are miscible with the lubricants of this invention in the range of −40° C. to at least +20° C. are included.

HFC-134a, the preferred tetrafluoroethane refrigerant, may be prepared by any of the methods disclosed in the prior art; e.g., U.S. Pat. Nos. 2,745,886; 2,887,427; 4,129,603; 4,158,675; 4,311,863; 4,792,643 and British 1,578,933 and 2,030,981, which are incorporated herein by reference.

The most preferred di-hydroxyl polyalkylene glycol for use in this invention is based on the random polymerization of a 50/50 weight percent mixture of ethylene oxide and propylene oxide initiated with diethylene glycol. Although the amount of ethylene oxide can range from 25 to 75 weight % of the ethylene oxide/propylene oxide composition and the viscosity can range from about 100 to 1200 SUS viscosity at 100° F., preferably 400 to 1200 SUS, the most preferred PAG is the "50H400" (400 representing the SUS viscosity at 100° F.; "H" representing "hydrophilic" and "50" indicating the presence of 50% ethylene oxide units) that is manufactured by the Union Carbide Corporation. The process for its manufacture is described in the 1986 edition of the Encyclopedia of Polymer Science and Engineering.

The preferred 50H400 oil has a pour point below −40° C., is completely miscible with HFC-134a from −50° C. to condenser temperatures above 45° C., and should meet all the other requirements for automotive air conditioning, i.e. viscosity index, stability, lubricity, and miscibility with HFC-134a down to below −10° C. Furthermore, the use of an extreme pressure additive such as those mentioned previously should improve the load-carrying capability significantly.

Specifically, the lubricants used in the compositions of this invention, and in the invented method for providing lubrication in compression refrigeration equipment have the following characteristics:

Viscosity at 100° F.

100 to 1200 SUS, preferably 400 to 1200 SUS, most preferably 500 SUS for automotive air-conditioning;

Viscosity index

>90, preferably 150 to 250 or higher;

Pour point

< −20° C., preferably −20° C. to about −50° C. and −35° C. for the 100 SUS and 1200 SUS oils, respectively;

Solubility or miscibility range

100% from at least 20° C. to less than −10° C. for 1-99 weight percent of HFC-134a in mixture with the lubricant.

1. Solubility of Refrigerant in Lubricants

Six ml. blends of refrigerant and lubricant were used for the solubility studies. Generally, the mixtures contained 30, 60 and 90 wt. % refrigerant. In some instances, more compositions were made to better define the miscible/immiscible region. These air-free mixtures were contained in sealed Pyrex ® tubes (7/16" I.D.×5.5", ca. 12.5 cc capacity). The refrigerant/lubricant solubilities were determined by completely immersing the tube in a bath at each test temperature for a minimum of 15 minutes and providing agitation to facilitate mixing and equilibration. The accuracy of determining the temperatures where the refrigerant/lubricant blend became either miscible or immiscible was about ±2° C. The refrigerant/lubricant blends were called immiscible when the blend acquired and retained "schlieren" lines, became hazy or cloudy, formed floc, or formed two liquid layers.

2. Viscosity and Viscosity Index a. Viscosity is a property that defines a fluid's resistance to shearing force. It is expressed in terms of absolute viscosity, kinematic viscosity or Saybolt Seconds Universal viscosity (SSU), depending on the method by which it is determined. Conversion from SSU to mm$^2$/s (centistokes) can be readily made from tables contained in ASTM D-455, but it is necessary to know the density to convert kinematic viscosity to absolute viscosity. Refrigeration oils are sold in viscosity grades, and ASTM has proposed a system of standardized viscosity grades for industry-wide usage (D-2422).

b. Viscosity Index is a measure of the amount of change experienced by an oil with temperature. Viscosity decreases as the temperature increases and increases as the temperature decreases. The relationship between temperature and kinematic viscosity is represented by:

$$\log \log (v+0.7) = A + B \log T$$

where $v$ = kinematic viscosity, mm$^2$/s (CST)
$T$ = thermodynamic temperature (kelvin)
$A, B$ = constants for each oil This relationship is the basis for the viscosity temperature charts published by ASTM and permits a straight line plot of viscosity over a wide temperature range. This plot is applicable over the temperature range in which the oils are homogenous liquids.

The slope of the viscosity-temperature lines is different for different oils. The viscosity-temperature relationship of an oil is described by an empirical number called the Viscosity Index (VI) (ASTM D-2270). An oil with a high viscosity index (HVI) shows less change in viscosity over a given temperature range than an oil with a low viscosity index (LVI).

3. Pour Point

Any oil intended for low temperature service should be able to flow at the lowest temperature likely to be encountered. This requirement is usually met by specifying a suitable low pour point. The pour point of an oil is defined as the lowest temperature at which it will pour or flow, when tested according to the standard method prescribed in ASTM D-97.

The invention will be more clearly understood by referring to the following experiments which are presented in Tables I-VI.

1. Solubility Data

Table I summarizes the solubility data for the di-functional random alkylene glycol polymers/tetrafluoroethane refrigerant compositions of this invention. The PAG's contained 25-75% ethylene oxide units and, correspondingly, 75-25% propylene oxide units. The preparation of the most preferred composition in Experiment 1 involved diethylene glycol as initiator.

It should be understood that Experiment 1 was an actual test run whereas Experiments 2-7 represent estimations based on the actual runs shown in Table IB and the minimum consolute temperatures shown in Table IA. Table IA illustrates that the minimum consolute temperature for the lubricant used in Experiment 1, 50H400, in combination with the refrigerant, HFC-134a, corresponds substantially to the minimum consolute temperature for the mixtures of HFC-134a with the lubricant, 50 HB400*, as determined from Figure I, a plot of minimum consolute temperatures vs. SUS viscosity at 100° F. for the 50 HB series. That is, the minimum consolute temperature for the mixture of HFC-134a and 50H400 is 47° C.; and the minimum consolute temperature for the mixture of HFC-134a and 50H400 is 45° C. The minimum consolute temperatures of 45° C. and 47° C. are within experimental error. Thus, it is expected that the estimated miscible ranges for Experiments 2-7 are substantially as shown in Table I.

* Manufactured by Union Carbide Corporation where H=hydrophilic; B=butanol initiated; 50=50% ethylene oxide units (and 50% propylene oxide units).

The solubility data shown in Table I indicate that PAG's used in the invention provided superior results when compared at equivalent viscosities, to:

(1) mono-functional PAG's containing 100% propylene oxide units as shown in Table II.
(2) PAG's with less than one —OH group as shown in Table III.
(3) PAG's containing 100% propylene oxide units with two —OH groups as shown in Table IV**.

** Minimum consolute temperature of 36° C. compared to 45° C. for the mixture of the invention as shown in Table IA.

(4) PAG's with three —OH groups, three of which were initiated with glycerine as shown in Table V.

In Table VI, data are presented showing the immiscibility of HFC-134a with miscellaneous refrigerant oils which may be used with CFC-12, including those oils typically used with CFC-12 for automotive air conditioning e.g. paraffinic (BVM-100N) and naphthenic (Suniso 5GS).

TABLE I

Solubility of Refrigerant (HFC-134a) with Lubricant
(PAG containing two functional —OH groups)
(Test Range: 93 to −50° C.)

| Expt. No. | Lubricant | Viscosity at 100° F. (SUS) | Weight % HFC-134A in Lubricant | Miscible Range (°C.) |
|---|---|---|---|---|
| 1 | 50H400** | 400 | 30 | 93 to −50 |
|  |  |  | 60 | 69 to −50 |
|  |  |  | 90 | 46 to −50 |
| 2* | 50H260 | 260 | 30 | 93 to −50* |
|  |  |  | 60 | 93 to −50* |
|  |  |  | 90 | 56 to −50* |
| 3* | 50H350 | 350 | 30 | 93 to −50* |
|  |  |  | 60 | 60 to −50* |
|  |  |  | 90 | 51 to −50* |
| 4* | 75H350 | 350 | 30 | 93 to −10* |
|  |  |  | 60 | 69 to −50* |
|  |  |  | 90 | 44 to −50* |
| 5* | 50H500 | 500 | 30 | 93 to −50* |
|  |  |  | 60 | 55 to −50* |
|  |  |  | 90 | 42 to −50* |
| 6* | 25H530 | 530 | 30 | 93 to −50* |
|  |  |  | 60 | 58 to −50* |
|  |  |  | 90 | 37 to −50* |
| 7* | 50H660 | 660 | 30 | 50 to −50* |
|  |  |  | 60 | 40 to −50* |
|  |  |  | 90 | 30 to −50* |

*Estimated from comparison to monofunctional series of random polyoxyalkylene glycols
**Manufactured by Union Carbide Corporation where: H = hydrophilic
50 = 50/50 wt. % polyoxyethylene/polyoxypropylene
400 = 400 SUS viscosity at 100° F.

TABLE IA

Minimum Consolute Temperatures of Random
PAG's containing 50% oxyethylene units

| Lubricant | Minimum Consolute Temperature (°C.) |
|---|---|
| 50HB260 | 56 |
| 50HB400 | 47 |
| 50H400 | 45 |
| 50HB500 | 42 |

TABLE IA-continued

Minimum Consolute Temperatures of Random PAG's containing 50% oxyethylene units

| Lubricant | Minimum Consolute Temperature (°C.) |
|---|---|
| 50HB660 | 30 |

TABLE IB

Solubility of Refrigerant (HFC-134a) with Lubricant (Random PAG's containing one functional —OH group) (Test Range: 93 to −50° C.)

| | Miscible Range for Indicated Concentration of HFC-134a in Lubricant | | |
|---|---|---|---|
| Lubricant | 30% | 60% | 90% |
| 50HB260 | 93 to −50 | 93 to −50 | 56 to −50 |
| 50HB400 | 93 to −49 | 69 to −50 | 43 to −50 |
| 50HB500 | 93 to −50 | 55 to −50 | 42 to −50 |
| 50HB660 | 50 to −50 | 40 to −50 | 30 to −50 |

*Manufactured by Union Carbide Corporation where 50 = wt. % ethylene oxide units (remainder propylene oxide units);
H = hydrophilic
B = butanol-initiated polymer
260, 350, 400, etc. = SUS viscosity at 100° F.

TABLE II

Solubility of HFC-134a with Mono-functional PAG's Containing No Ethylene Oxide Units (Test range 93 to −50° C.)

| Expt. No. | Lubricant* | Wt. % HFC in HFC/Oil Mix | Miscible Range (°C.) |
|---|---|---|---|
| Control A | LB-165** | 30,60 | 93 to −50 |
| | | 70 | 80 to −50 |
| | | 73,90 | 73 to −50 |
| | | 94 | 68 to −50 |
| Control B | LB-285** | 60 | 78 to −50 |
| | | 80 | 40 to −50 |
| | | 94 | 53 to −50 |
| | | 97 | 58 to −50 |
| | | 99 | 58 to −50 |
| Control C | LB-525** | 30 | 40 to −50 |
| | | 60 | 36 to −40 |
| | | 90 | −7 to −23 |

*Key for determining lubricant
L = lipophilic
B = butanol-initiated polymer
no first number = 0% ethylene oxide units or 100% propylene oxide units
165,285 and 525 = SUS viscosity at 100° F.
**Manufactured by Union Carbide Corporation

TABLE III

Solubility of HFC-134a with PAG's Containing Less Than One Functional OH Group (Test Range: 93 to −50° C.)

| Expt. No. | Oil | Miscible Range (°C.) for Shown Concs. of HFC in Oil (Wt. %) | | |
|---|---|---|---|---|
| | | 30% | 60% | 90% |
| Control D | 50HG300(+3 acetoxy caps)* | 93 to −10 | 93 to −10 | 67 to −50 |
| Control E | 50H400(+2 acetoxy caps)** | 93 to −10 | 93 to −10 | 53 to −50 |
| Control F | 50HB400(+1 acetoxy cap)*** | 93 to −10 | 25 to −50 | 25 to −50 |
| Control G | 50HB500(+0.5 butyl cap)*** | Insoluble | Insoluble | Insoluble |
| Control H | 50HB500(+0.91 methyl cap)*** | 93 to 45 | 93 to 45 | Insoluble |
| Control I | 50HB500(+0.95 methyl cap)*** | 93 to 50 | 93 to 75 | Insoluble |

*50HG300 + 3 acetoxy caps
key: 50 = 50/50 wt. % polyoxyethylene/polypropylene
H = hydrophyllic
G = PAG initiated with glycerol
300 = 300 SUS viscosity at 100° F.
3 acetoxy caps = the 3 OH groups were capped with the acetoxy group from acetic anhydride
**Polymer initiated with diethylene glycol
***Polymer initiated with butanol

TABLE IV

Minimum Consolute Temperature of Mixtures of HFC-134a with PAG's Containing Two Functional OH Groups

| Expt. No. | Oil | Viscosity at 100° F. SUS | Minimum Consolute Temperature (°C.) |
|---|---|---|---|
| Control J | Polyoxypropylene diol* | 554 | 31 |
| Control K | Polyoxypropylene diol** | 154 | 45 |
| Control L | Polyoxypropylene diol | 400 | 36*** |

*Manufactured by CPI Engineering Co.
**"Niax PPG425" manufactured by Union Carbide Corp.
***Linear interpolation from Controls J and K

TABLE V

Solubility of HFC-134a with PAG's Containing Three Functional OH Groups (Test Range: 93 to −50° C.)

| Expt. No. | Oil | Viscosity at 100° F. SUS | Wt. % HFC-134a in Oil | Miscible Range (°C.) |
|---|---|---|---|---|
| Control M | 50HG400* | 400 | 30 | 93 to 25 |
| | | | 60 | 25 to 5 |
| | | | 90 | 25 to −50 |
| Control N | 50HG450* | 450 | 30 | 25 to −50 |
| | | | 60 | 25 to −50 |
| | | | 90 | 20 to −50 |
| Control O | 100HG550* | 550 | 30 | 24 to −40 |
| | | | 60 | Insoluble |
| | | | 90 | Insoluble |
| Control P | $CH_3C(CH_2OCH_2-CH_2OCH_2CH_2OH)_3$ | 562 | 30 | Insoluble |
| | | | 60 | Insoluble |
| | | | 90 | Insoluble |

*G = Glycerol-initiated polymer

TABLE VI

Solubility of HFC 134a with Available Miscellaneous Refrigrant Oils
(Test Range: 93 to −50° C. unless indicated otherwise)

| Expt. No. | Oil | Miscible Range (°C.) for Indicated Concentration (Wt %) of HFC-134a In Lubricant | | |
|---|---|---|---|---|
| | | 30% | 60% | 90% |
| | Dipentaerythritol Esters of Fatty Acids (c) | | | |
| Control Q | 240 SUS | −50+ | −4+ | 40+ |
| Control R | 290 SUS | −44+ | −17+ | 70+ |
| | PEG Esters of Fatty Acids (d) | | | |
| Control S | 144 SUS | −21+ | 54(a) | 54(a) |
| Control T | 620 SUS | −4+ | 4+ | 70+ |
| Control U | 830 SUS | −6+ | 70+ | 70+ |
| | Napthenic Oils (e) | | | |
| Control V | Suniso ® 5GS (500 SUS, 38% aromatic) | 54(a) | 54(a) | 54(a) |
| Control W | Witco 500 (500 SUS) | 54(a) | 54(a) | 54(a) |
| Control X | Expt. Oil (520 SUS, 47% aromatic) | 54(a) | 54(a) | 54(a) |
| Control Y | Expt. Oil (529 SUS, 75% aromatic) | 54(a) | 54(a) | 54(a) |
| | Paraffin Oil (b) | | | |
| Control Z | BVM-100N (500 SUS) | 54(a) | 54(a) | 54(a) |
| | Alkyl Benzene | | | |
| Control A' | Zerol 300 (300 SUS) (g) | 54(a) | 54(a) | 54(a) |
| Control B' | DN600 (125 SUS) (h) | 54(a) | 54(a) | 54(a) |
| Control C' | Atmos HAB15F (78 SUS) (i) | 55+ | Ins(b) | Ins(b) |
| | Silicone Oils | | | |
| Controls D',E',F' | L-45 Oils (163, 231, & 462 SUS) (j) | Ins(b) | Ins(b) | Ins(b) |

+ - Soluble at and above shown temperature.
(a) - May be soluble above shown temperature.
(b) - Completely insoluble from 93 to −50° C.
(c) - Hercules
(d) - CPI Engineering
(e) - Witco Chemical Co.
(f) - BVM Associates
(g) - Shrieve Chemical Co.
(h) - Conoco
(i) - Nippon Oil KK
(j) - Union Carbide

What is claimed is:

1. A composition for use in compression refrigeration consisting essentially of:
   (a) at least one compound selected from the group consisting of tetrafluoroethane and pentafluoroethane; and
   (b) a sufficient amount to provide lubrication of at least one random polyalkylene glycol which is di-functional with respect to hydroxyl groups and based on 25% to 75% ethylene oxide and, correspondingly, 75% to 25% propylene oxide, having an SUS viscosity at 37.8° C. of 100 to 1200 and being miscible in combination with component (a) in the range of temperatures from −40° C. to +20° C.

2. The composition of claim 1 wherein said tetrafluoroethane is 1,1,2,2-tetrafluoroethane.

3. The composition of claim 1 wherein said tetrafluoroethane is 1,1,1,2-tetrafluoroethane.

4. The composition of claim 1 wherein component (a) is pentafluoroethane.

5. The composition of claim 1 wherein said di-functional polyalkylene glycol has been prepared using diethylene glycol as an initiator.

6. The composition of claim 1 wherein the SUS viscosity at 100° F. of said di-functional polyalkylene glycol is from 400 to 1000.

7. The composition of claim 1 wherein said polyalkylene glycol comprises 1–99% by weight of said composition.

8. The composition of claim 1 further comprising component (c) selected from the group consisting of (1) an extreme-pressure additive, (2) an oxidation and thermal stability improver and (3) a corrosion inhibitor.

9. The composition of claim 1 further comprising 0.1–1.3% by weight of an extreme pressure additive.

10. A method for improving lubrication in compression refrigeration equipment using tetrafluoroethane as the refrigerant consisting essentially of using 1–99% by weight of the combination with said tetrafluoroethane of at least one random di-functional polyalkylene glycol based on 25% to 75% ethylene oxide and 75% to 25% propylene oxide and having an SUS viscosity of 100–1200 at 100° F.

11. The method of claim 10 wherein said polyalkylene glycol is based on about 50% ethylene oxide units and has an SUS viscosity of about 400 at 100° F.

12. A method for improving lubrication in compression refrigeration equipment using tetrafluoroethane as the refrigerant consisting essentially of using 10–50% by volume of the combination with said tetrafluoroethane of at least one random di-functional polyalkylene glycol based on 25% to 75% ethylene oxide and 75% to 25% propylene oxide and having an SUS viscosity of 400–1000 at 100° F.

* * * * *